US006441088B1

(12) United States Patent
Kaul et al.

(10) Patent No.: US 6,441,088 B1
(45) Date of Patent: Aug. 27, 2002

(54) POLYAMIDE HINDERED AMINES

(75) Inventors: Bansi Lal Kaul, Biel-Benken (CH); Angelos Elie Vougioukas, Sefakoy/Istanbul (TR)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/668,523

(22) Filed: Sep. 22, 2000

Related U.S. Application Data

(60) Division of application No. 09/359,827, filed on Jul. 23, 1999, now Pat. No. 6,218,452, which is a division of application No. 08/882,508, filed on Jun. 25, 1997, now Pat. No. 5,932,640, which is a continuation of application No. 08/466,500, filed on Jun. 6, 1995, now abandoned, which is a continuation of application No. 08/144,915, filed on Oct. 28, 1993, now abandoned, which is a continuation of application No. 07/727,691, filed on Jul. 10, 1991, now abandoned, which is a continuation-in-part of application No. 07/467,597, filed on Jan. 19, 1990, now abandoned.

(30) Foreign Application Priority Data

| Jan. 21, 1989 | (DE) | 39 01 716 |
| Jan. 21, 1989 | (DE) | 39 01 717 |
| Sep. 9, 1989 | (DE) | 39 30 089 |
| Oct. 4, 1990 | (DE) | 40 31 280 |

(51) Int. Cl.$^7$ .......................... C08K 5/34; C08G 69/08
(52) U.S. Cl. ........................ 524/718; 524/720; 528/310; 528/323
(58) Field of Search ................. 524/718, 720; 528/310, 323

(56) References Cited

U.S. PATENT DOCUMENTS

| 3,775,411 A | 11/1973 | Brunetti |
| 3,993,655 A | 11/1976 | Rasberger et al. |
| 4,028,334 A | 6/1977 | Chalmers et al. |
| 4,046,735 A | 9/1977 | Harris |
| 4,161,592 A | 7/1979 | Evans et al. |
| 4,187,377 A | 2/1980 | Narisawa et al. |
| 4,221,701 A | 9/1980 | Rasberger et al. |
| 4,292,240 A | 9/1981 | Lai et al. |
| 4,363,890 A | 12/1982 | Ohshita et al. |
| 4,404,293 A | 9/1983 | Cigna et al. |
| 4,543,378 A | 9/1985 | Suhara et al. |
| 4,548,972 A | 10/1985 | Williams |
| 4,743,657 A | * 5/1988 | Rekers ........................ 525/281 |
| 4,816,585 A | 3/1989 | Raynor et al. |
| 5,618,909 A | * 4/1997 | Lofquist et al. ............. 528/310 |
| 5,851,238 A | 12/1998 | Gadoury et al. |

FOREIGN PATENT DOCUMENTS

| CA | 2019751 | 12/1990 |
| DE | 32 33 951 | 3/1984 |
| DE | 32 33 953 | 3/1984 |
| GB | 2 107 719 | 5/1983 |
| JP | 60-190786 | 9/1985 |
| JP | 62-190786 | 8/1987 |

OTHER PUBLICATIONS

English abstract for JP 60–190786, Sep. 28, 1985.
English abstract for JP 62–190786, Aug. 20, 1987.
Dr. K.G. Kleb, Angew. Chem. Internat. Edit., vol. 3 (1964), No. 6, New Reactive Dyes, p. 408–416.
Von E. Siegel, Chemica Supplement, Mar. 1968, Chemie der Reaktivfarbstoffe, p. 100–114.
K. Venkataraman, The Chemistry of Synthetic Dyes, vol. 6, 1972, Academic Press, p. 1–209.
Derwent Patent Family Abstract for DE 32 33 951.
Derwent Patent Family Abstract for DE 32 33 953.
Allen, Norman S. and Harrison, Michael J., Polymer Degradation and Stability 21 (1988) "Thermal and Photo–chemical Degradation of Nylon 6,6 Polymer: Part II–Influence of Hindered Piperidine Light Stabilisers" p. 251–262.

* cited by examiner

Primary Examiner—Kriellion A. Sanders
(74) Attorney, Agent, or Firm—Anthony A. Bisulca

(57) ABSTRACT

Synthetic polyamide comprising one or more of the following compounds:

a) a compound having at least one sterically hindered amino group, [hereinafter referred to as compounds a)]; or b) a trimesinic acid trialkylamide, at least one alkyl group of which bears at least one free amino and/or alkylamino group [hereinafter referred to as compounds b)]; or c) a trialkylamino-substituted triazine, at least one alkyl group of which carries a free amino and/or alkylamino group [hereinafter referred to as compounds c)]; or d) a dyestuff that is free of sulphonic acid groups and contains at least one group that is reactive to a hydroxy and/or amino group [hereinafter referred to as compounds d)]; or e) a synthetic polyamide containing at least one group that is reactive with a hydroxy and/or amino group [hereinafter referred to as compounds e)].

10 Claims, No Drawings

POLYAMIDE HINDERED AMINES

This application is a division of application Ser. No. 09/359,827, Jul. 23, 1999, now U.S. Pat. No. 6,218,452, which is a division of application No. 08/882,508, Jun. 25, 1997, now U.S. Pat. No. 5,932,640, which is a continuation of application No. 08/466,500, Jun. 6, 1995, abandoned, which is a continuation of application No. 08/144,915, Oct. 28, 1993, abandoned, which is a continuation of application No. 07/727,691, Jul. 10, 1991, abandoned, which is a continuation-in-part of application Ser. No. 07/467,597, Jan. 19, 1990, abandoned.

It has been found that the dyeability or mass coloration of synthetic polyamides preferably with anionic dyes can be improved by incorporating into untreated polyamide one or more of the following compounds:

a) a compound having at least one sterically hindered amino, imino or amido group (preferably amino); [hereinafter referred to as compounds a)]; or b) a trimesic acid trialkylamide, or pyromellitic acid tetra-alkylamide, at least one alkyl group of which bears at least one free amino, imino, amido and/or alkylamino group [hereinafter referred to as compounds b)]; or c) a trialkylamino, imino or amido substituted triazine, at least one alkyl group of which carries a free amino, imino, amido and/or alkylamino group [hereinafter referred to as compounds c)]; or d) a dyestuff (preferably of the azo-, anthraquinone- or perinone series) that contains at least one group that is reactive to a hydroxy and/or amino group and is preferably free of sulphonic acid groups [hereinafter referred to as compounds d)]; or e) a synthetic modified polyamide (preferably a polymeric or oligomeric isophthalic acid amide or terephthalic acid amide) containing at least one group that is reactive with a hydroxy and/or amino group [hereinreferred to as compounds e)].

Compounds containing a sterically hindered amino group are preferably those containing a group of the formula

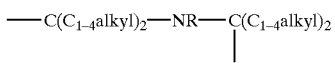

in which

R is hydrogen, $C_{1-8}$alkyl, $C_{1-8}$alkoxy, or —$COR_5$,
where $R_5$ is hydrogen, $C_{1-6}$alkyl, phenyl, $COO(C_{1-4}$alkyl) or $NR_{15}R_{16}$;
where $R_{15}$ is hydrogen, $C_{1-12}$alkyl, $C_{5-6}$cycloalkyl, phenyl or ($C_{1-12}$alkyl)phenyl; and $R_{16}$ is $C_{1-12}$alkyl or hydrogen; or
$R_{15}$ and $R_{16}$ together with the N atom to which they are attached form a five- to seven-membered ring which may contain an additional N or O atom (preferably forming a piperidine or a morpholine ring).

Preferred groups containing sterically hindered amines are of the formula I to VI

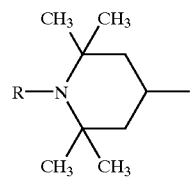

I

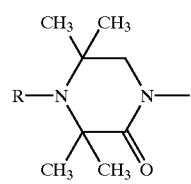

II

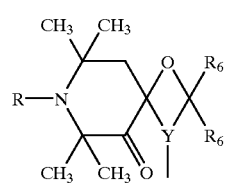

III

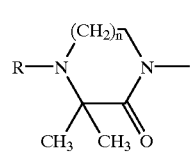

IV

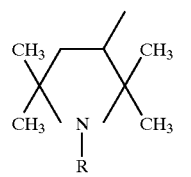

V

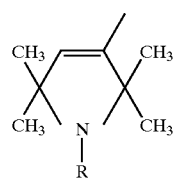

VI in which

R is hydrogen, $C_{1-8}$alkyl, $C_{1-8}$alkoxy, or —$COR_5$;
where $R_5$ is hydrogen, $C_{1-6}$alkyl, phenyl, —$COO(C_{1-4}$alkyl) or $NR_{15}R_{16}$;
where $R_{15}$ is hydrogen, $C_{1-12}$alkyl, $C_{5-6}$cycloalkyl, phenyl or ($C_{1-12}$alkyl)phenyl; and $R_{16}$ is $C_{1-12}$alkyl or hydrogen or
$R_{15}$ and $R_{16}$ together with the N atom to which they are attached form a five- to seven-membered ring which may contain an additional N or O atom (preferably forming a piperidine or a morpholine ring); and Y is the group

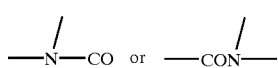

where CO forms a part of the cyclic structure;
each $R_6$ independently is selected from hydrogen, $C_{1-2}$alkyl or phenyl, provided only one group $R_6$ can be phenyl, or both groups $R_6$ together form the group $-(CH_2)_{11}-$, $-(CH_{2n}-$, $-C(CH_3)_2-$, $-C(CH_3)_2-CH_2CH_2-$ or $-C(CH_3)_2CH_2CH_2CH(CH_3)-$, and
n is 1 or 2.
Compounds containing groups of formulae III, IV and V are known, for example, from U.S. Pat. No. 4,292,240 and Japanese Kokai 62-190786, the contents of which are are incorporated herein by reference.
More preferred compounds of a) to c) are those of formulae 1 to 38 below:
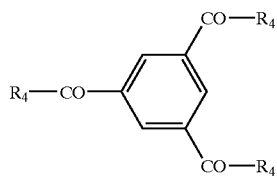
1.
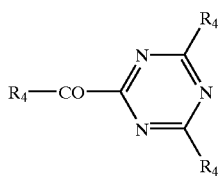
2.
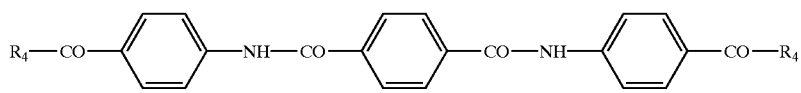
3.
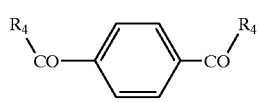
4.
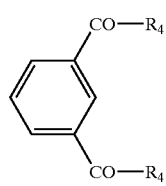
5.
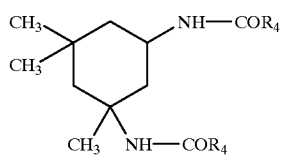
6.
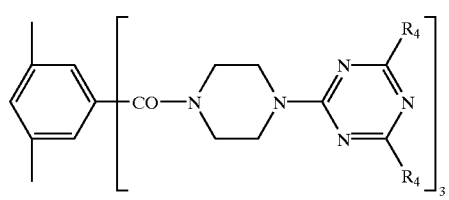
7.
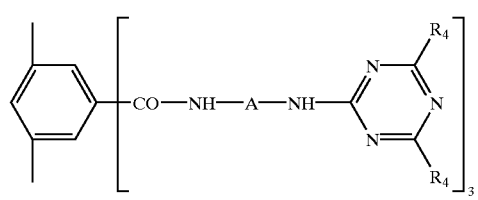
8.
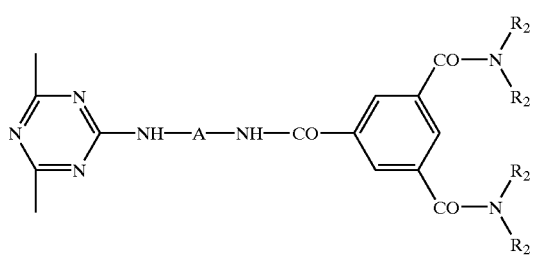
9.
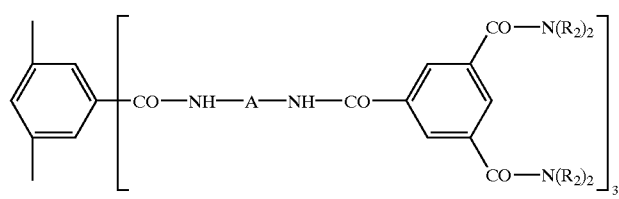
10.
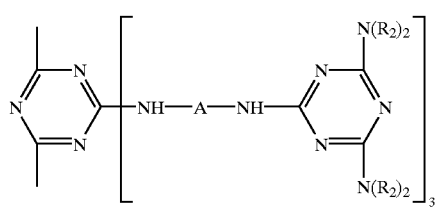
11.
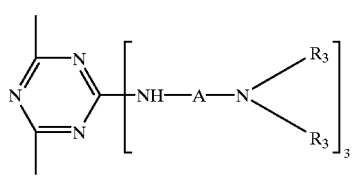
12.

-continued
13.
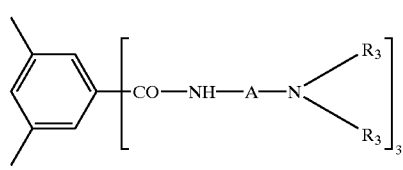
14.
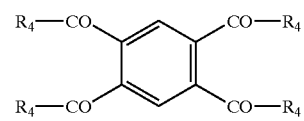
15.
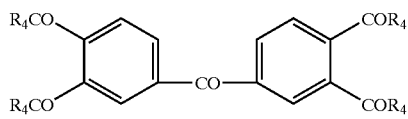
16.
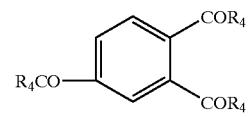
17.
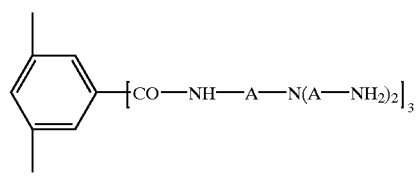
18.
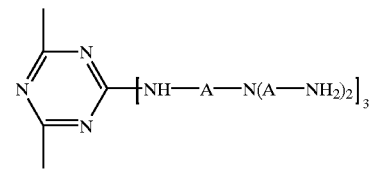
19.
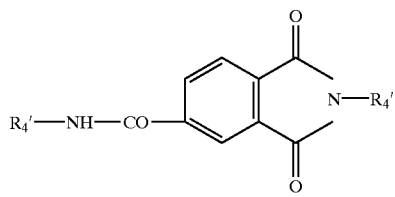
20.
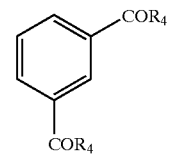
21.
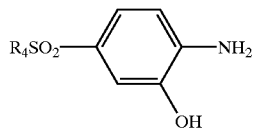
22.
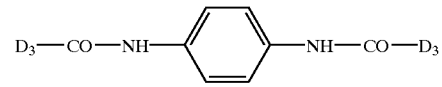
23.
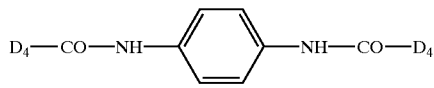
24.
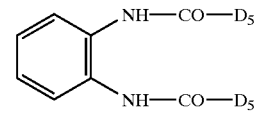
25.
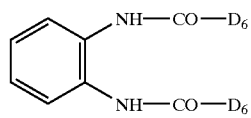
26.
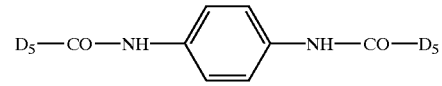
27.
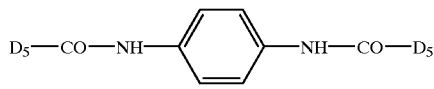
28.
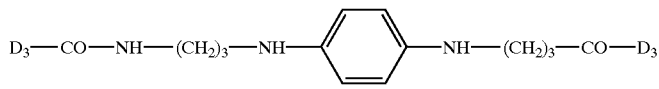
29.
30.
31.
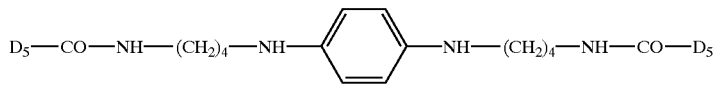

-continued
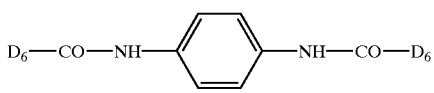
32.
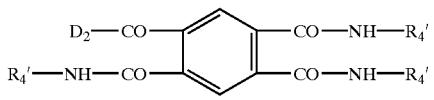
33.
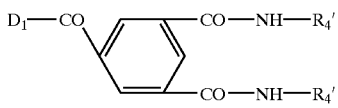
34.
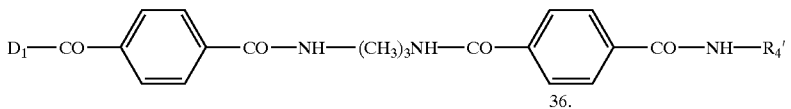
35.
36.
37.
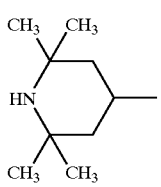
38.
in which each $R_3$ independently is hydrogen or $C_{1-12}$ alkyl;
$R_4$ is a group of formula α or β
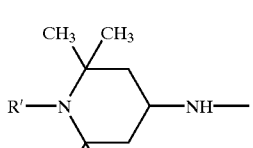 (α)
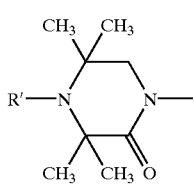 (β)
where R' is hydrogen, $C_{1-6}$ alkyl, $C_{1-4}$ alkoxy or —CO—$C_{1-14}$ alkyl.
A is $C_{2-3}$ alkylene;
$R_4'$ is of formula α' or α"
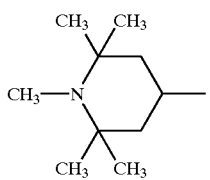 (α')
(α")
$R_2$ is $C_{1-3}$ alkyl.
$D_1$ is
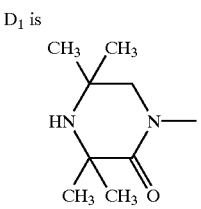
where
$D_2$ is
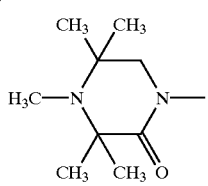
$D_3$ is
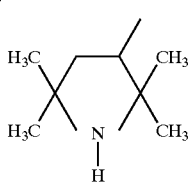
$D_4$ is
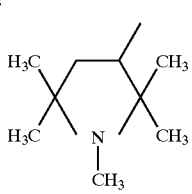

$D_5$ is

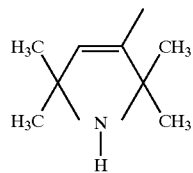

$D_6$ is

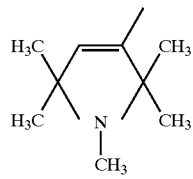

and $D_7$ is

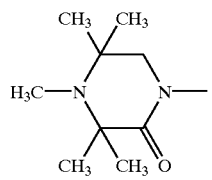

Preferred groups that are reactive to —OH or —NH$_2$ (of compounds of d) and/or e) are e.g. those known as reactive groups in the chemistry of reactive dyes. More preferably such are cyclic groups having at least 2 nitrogen atoms (separated preferably by one or two carbon atoms), e.g. triazinyl-, pyrimidyl-, quinoxalyl-, quinazolyl groups phthalazinyl, benzoxazolyl and benzthiazolyl groups, bearing 1 to 3 chlorine atoms on the carbon atoms adjacent to the nitrogen atoms.

Additional more preferred reactive groups are of formula i) to xi)

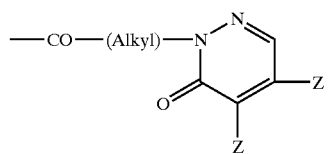  i)

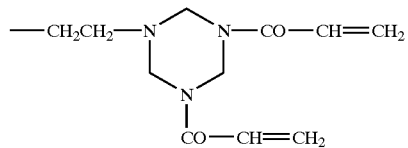  ii)

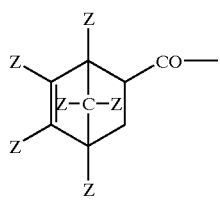  iii)

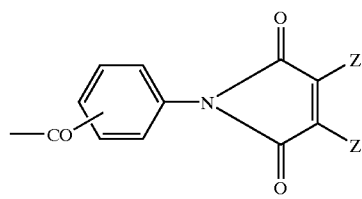  iv)

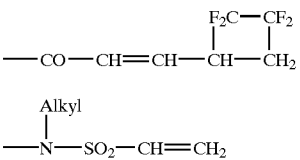  v)

  vi)

—CO—CH$_2$ CH$_2$ SO$_2$—C$_6$H$_5$  vii)

—CO—CH=CH$_2$  viii)

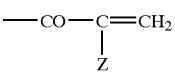  ix)

—CO—CH=CCl$_2$  x)

—CO—CH$_2$—Z and  xi)

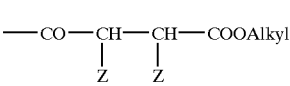  xii)

in which Z is a halogen (preferably chlorine) or a group of the formula

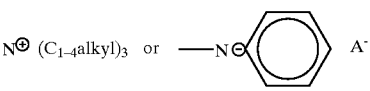

where A$^-$ is an anion.

Preferably Alkyl is C$_{1-4}$alkyl.

Such groups are described in The Chemistry of Synthetic Dyes, Vol. VI, Chapter I—by E. Siegel, [editor K. Venkataraman,]Academic Press. (1972);

Chimica, Supplement März 1968, Farben Symposium Interlaken, p. 102 et seq—E. Siegel "Chemie der Reactivfarbstoffe" and Angew. Chem. 76, (1964), No. 10, p. 423 et seq—K. G. Kleb "Ueber neue Reactivfarbstoffe".

Of particular interest are those compounds a) to c) for incorporation into synthetic polyamides having one or two sterically hindered amino groups and one or two groups reactive to —OH and/or —NH$_2$.

Such compounds having one or two sterically hindered amino groups and one or two groups reactive to OH and/or —NH$_2$ are of formulae 39 to 46 below:

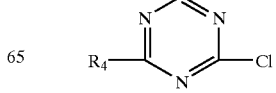  39.

-continued

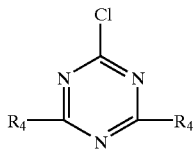
40.

R₄—CO—CH=CH₂  41.

R₄—CO—CH₂CH₂SO₂C₆H₅  42.

R₄—SO₂—CH=CH₂  43.

44.
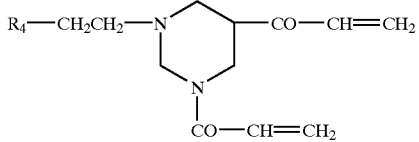

45.
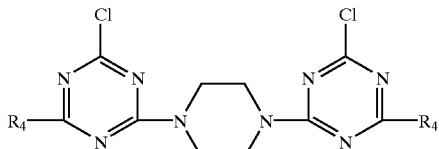

46.
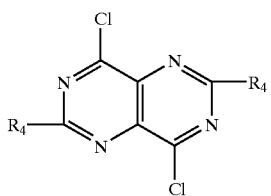

Compounds of formulae 39–46 can be prepared conventionally, e.g. by condensing the appropriate acid chloride or the cyanuric-acid chloride with a free amino or imino group of a sterically hindered amine containing compound in appropriate amounts.

The preferred azo, anthraquinone or perinone dyestuffs of compounds d having groups that are reactive to hydroxy and/or amino groups are preferably those described in Examples 50 to 69 inclusive, hereinafter described.

Examples 50–58 are in 2:1 chromium complex form.

Example 50

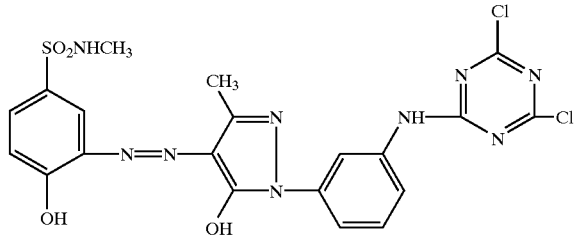

Example 51

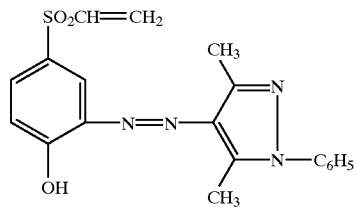

Example 52

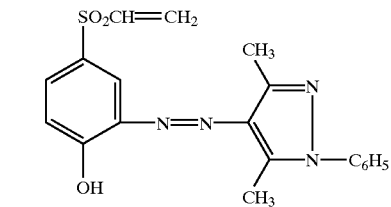

Example 53

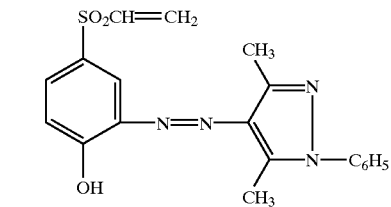

Example 54

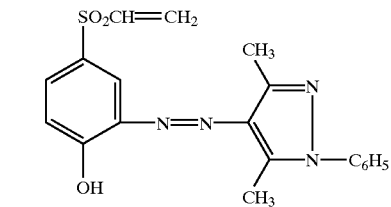

Example 55

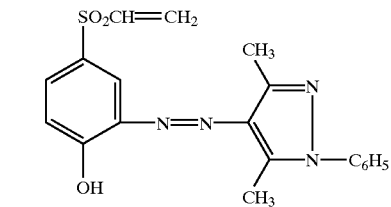

Example 56
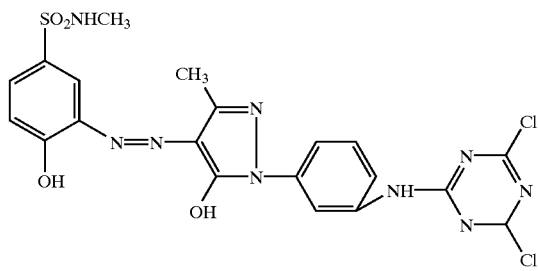
Example 57
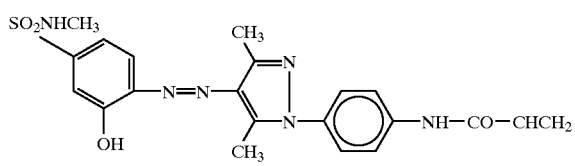
Example 58
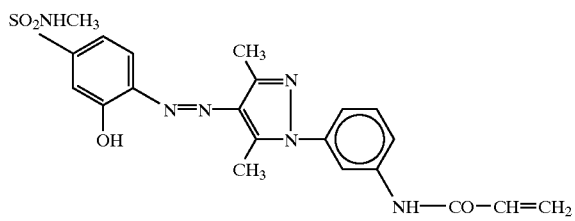
Example 59
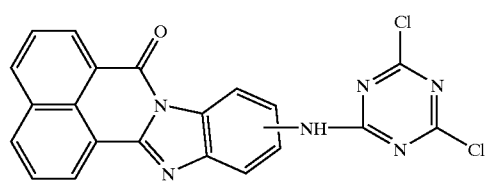
Example 60
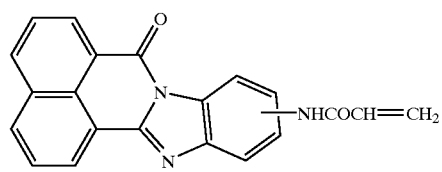
Example 61
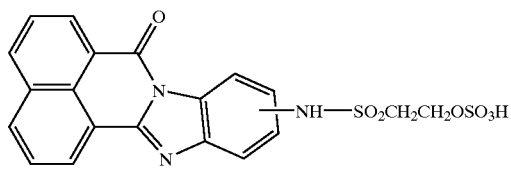
Example 62
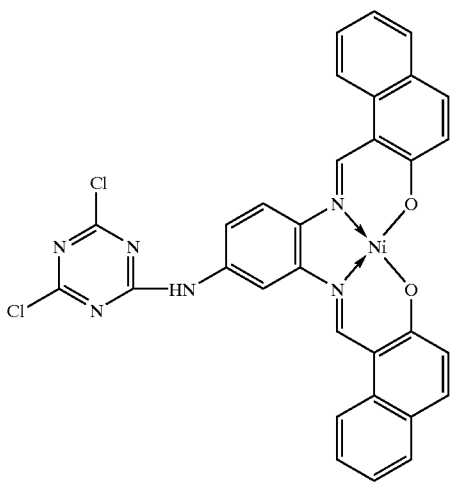
Example 63
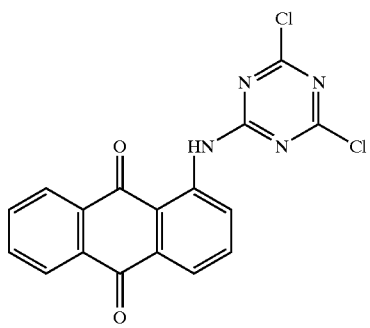
Example 64
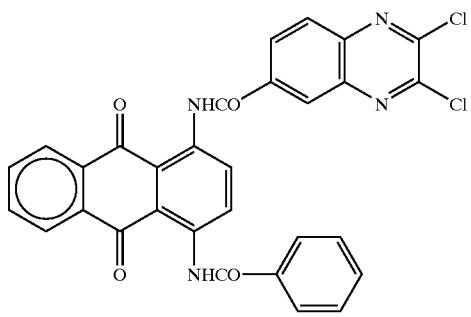

Example 65

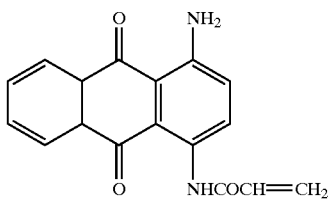

Example 66

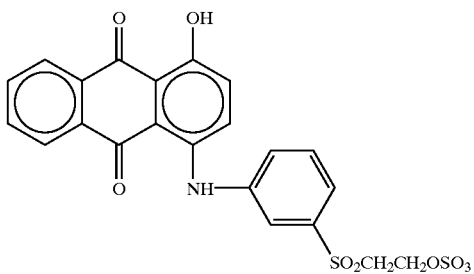

Example 67

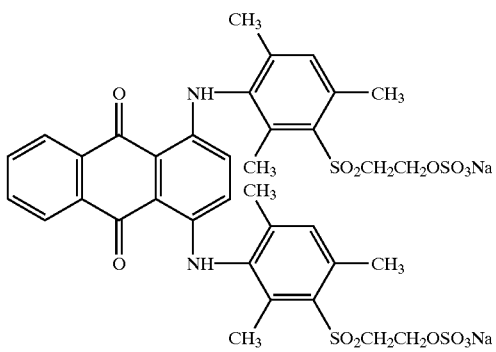

Example 68

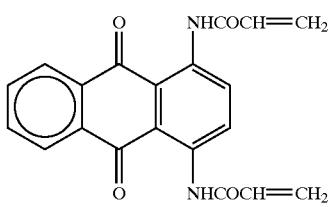

Example 69

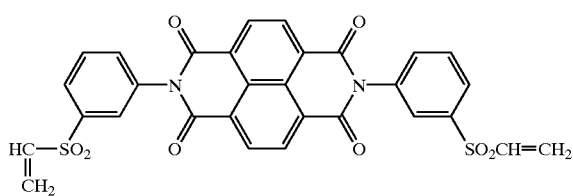

The preferred polymeric isophthalic or terephthalic acid amides of compounds e) and a) respectively are those of formula VII and VIII $$Pa—(R_{11})_n \qquad \text{VII}$$
$$Pa—(CO—R_{12})_n \qquad \text{VIII}$$

in which Pa is a nitrogen containing radical of a synthetic polyamide, $R_{11}$ is a group attached to the nitrogen atom of the polyamide molecule containing one or more groups reactive to hydroxy and/or amino, $R_{12}$ is a group containing a sterically hindered amino group and m is 1 or 2.

The compounds of formulae VII and VIII can be added to a synthetic polyamide before, during or after the polycondensation synthesis or worked into the molten mass.

The compounds of formula VIII can be produced when a synthetic polyamide having a terminal carboxy group or functional derivative thereof (e.g. the acid chloride or an ester) is reacted during the polycondensation process with one or more amino groups or one or more sterically hindered amino group containing compounds, preferably of aromatic nature. The reactive groups are preferably those described above as groups of formula i–xii.

The compounds of the formula $R_{12}H$ which are used for producing the compounds of formula VIII have a reactive nitrogen atom that is either an amino group or part of a cycle group, for example a piperazine group. These compounds may also contain one or two sterically hindered nitrogen atoms in a cyclic structure, for example N—$C_{1-4}$alkyl or N-acyl substituted 2,2,6,6-tetraalkylpiperidyl-4-groups.

The synthetic polyamides according to the invention can be dyed in the mass with any type of dyestuff, provided that it is stable at high temperatures (of the melt). Preferred dyestuff groups are the monoazo-metal complexes, in particular the chrome complexes that are sufficiently stable at high temperatures to be used. Preferred reactive dyestuffs that can be used are the halogen-containing triazinyl or vinyl group containing metallized azo dyestuffs (i.e., those metallized with chromium, nickel or copper). Such reactive dyestuffs have been commercially available for a number of years.

The preparation of modified synthetic polyamides according to the invention can be effected in a conventional manner, preferably by mixing the reactive compounds with molten synthetic polyamide, e.g. in an extruder prior to spinning, or before or during the polycondensation process of the synthetic amide itself.

Generally one uses 0.5 to 5 percent by weight of the compounds a) to e) based on the weight of synthetic polyamides. More preferably 1 to 2 percent by weight of the compounds a) to e) are used.

The synthetic polyamides according to the invention (e.g. containing a compound a) to e)) are outstanding in many respects compared to synthetic polyamide which does not contain a compound a) to e)—hereafter referred to as "untreated polyamide". When dyeing untreated polyamide and polyamide according to the invention with acid dyes is carried out (using the same quantity of dyestuffs on the substrate), a considerably deeper and more brilliant dyeing is obtained with the synthetic polyamides according to the invention than untreated polyamide. Bath exhaustion is noticeably better and the fastnesses, especially wet fastnesses, are improved.

If reactive dyes are used to dye synthetic polyamides according to the invention, in general between 0.05 and 5 percent by weight of the reactive dyes are used based on the weight of synthetic polyamides. More preferably the amounts of reactive dye used is between 0.1 and 3 percent by weight. The dyeings so obtained are also deeper than exhaust dyeings made with the same amount of dye on the untreated synthetic polyamide.

Further according to the invention, there is provided a process for aftertreating a synthetic substrate, for example polyamide, cellulose and cellulose derivative substrates that have been dyed with anionic dyes characterized in that a solution or dispersion of a compound a) (preferably cycloaliphalic compound containing at least one sterically hindered amine group) is applied thereto.

Preferably the sterically hindered group is a 2,2,6,6-tetramethyl-piperidinyl group.

Preferably the substrate is polyamide.

A preferred compound a) is one containing the groups I to VI as defined above.

The compound a) containing groups of formula I are more preferred.

Most preferred compounds a) are of formula XX and XXI

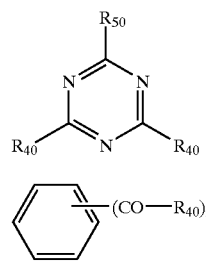

(XX)

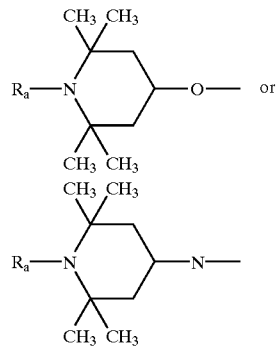

(XXI)

in which $R_{40}$ is a group of the formula where $R_a$ is hydrogen, methyl or —CO—CH$_3$.

$R_{50}$ is chloro or a significance of $R_{40}$ independent of $R_{40}$ $n_a$ is 2, 3 or 4.

Preferred compounds a) are also those of formula 1 to 38 that contain two or three sterically hindered amine groups.

Preferred dyes that can be used to dye polyamide prior to aftertreating with compounds a) are selected from:

C.I. Acid Blue 25,40,72,106,126,129,227,230,278,280 and 296

C.I. Acid Yellow 59,112,114,127 and 129

C.I. Acid Red 261 and 404

C.I. Acid Green 40

C.I. Acid Orange 82

C.I. Acid Violet 66

C.I. Acid Brown 28,30 and 289

C.I. Acid Black 58 and 115

C.I. Solvent Yellow 83

C.I. Solvent Red 90:1,91 and 92

C.I. Solvent Black 45

EXAMPLES

In the following examples, all parts and percentages are by weight, and all termperatures are given in degrees celsius.

Example 1

98 parts of poly-ϵ-caprolactam in granulate form are mixed in a drum mixer with 2 parts of the compound of formula 1a

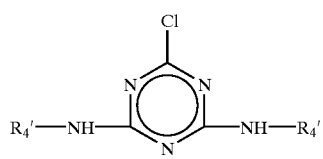

(1a)

where R'$_4$ is 2,2,6,6, tetramethyl piperidinyl-4, (prepared by the condensation of 2 moles of 2,2,6,6-tetramethyl-4-aminopiperidine with 1 mol of 2,4,6-trichlorotriazine in 5 moles of toluene, after which the solution is boiled under reflux for 10 hours, the residue is filtered, washed with acetone, then heated with aqueous NaOH at pH 12, filtered, washed and dried) in powder form. The powder is mixed in a drum mixer and disperses very rapidly and very evenly and adheres to the granulate. After ca. 10 minutes, the mixture is dried for 8 hours at 120°, added to a melt spinning machine and after leaving standing for 8 minutes at 275–280° under a nitrogen atmosphere, is spun into fibres.

The fibres thus obtained may be dyed or printed by known processes tel quel or after processing into yarns, or woven or knit fabrics as is usual for polyamide fibre material, using the appropriate acid dyes, e.g. the dyes C.I. Acid Red 216, C.I. Acid Violet 66, C.I. Acid Yellow 155, C.I. Acid Blue 230, C.I. Acid Red 129, C.I. Acid Yellow 18A, C.I. Acid Red 119 or C.I. Acid Blue 80.

The dyeings thus obtained have increased depth of colour (compared with the same dyeing made on untreated poly-ϵ-caprolactam), a good brilliance and good vet fastness properties.

An appropriate amount of the following compounds may be incorporated into synthetic polyamide material as described in example 1 in place of the compound of formula 1a.

Example 2

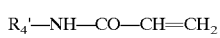

Example 3

Example 4

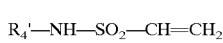

Example 5

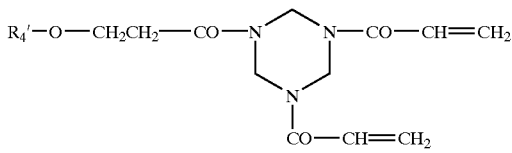

Example 6

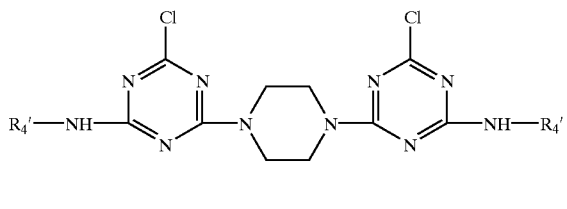

In Examples 1 to 6, $R_4'$ is 2,2,6,6-tetramethylpiperidinyl-4.

Examples 7–11

The following compounds can be prepared by a method analogous to that of Example 1 from appropriate reactants.

Example 7

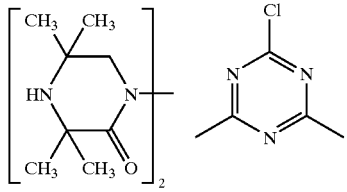

Example 8

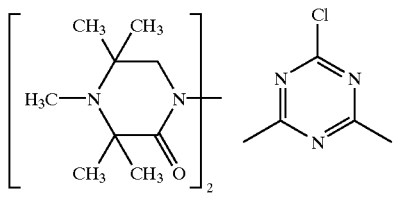

Example 9

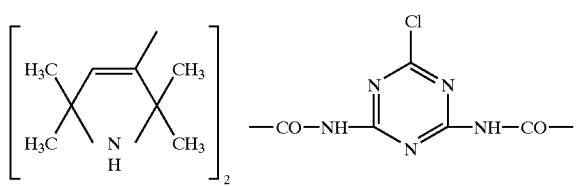

Example 10

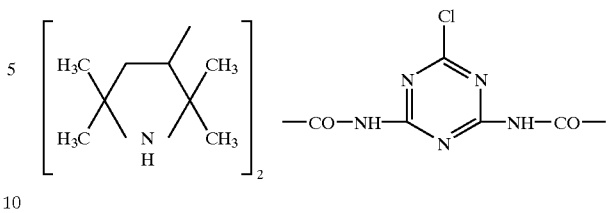

Example 11

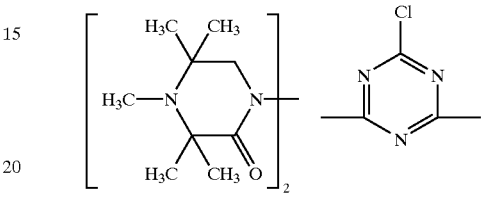

The products of Examples 7 to 11 can be washed into polyamide that can be used for spinning.

Example 12 a) Production of 1,3,5-tri-(2',2',6',6'-Tetramethylpiperidyl-4')-trimesic Acid Amide 42.0 g of trimesic acid are heated for 5 hours at 80° with 144.0 ml of thionyl chloride in the presence of catalytic quantities (3 ml) of dimethylformamide and then the excess thionyl chloride is distilled off. The trimesic acid trichloride thus formed is dissolved in 500 ml of dioxane, then a total of 187.2 g of 2,2,6,6-tetramethyl-4-aminopyridine is added dropwise whilst stirring, whereby dioxane (2000 ml in all) is constantly added to allow the reaction mixture, whose temperature should never exceed 30° C., to remain stirrable. The reaction mixture is subsequently boiled for 48 hours with reflux cooling, the residue is filtered, washed with acetone, dissolved in ca. 1000 ml of water, precipitated again with soda solution (at pH 10 to 11), filtered, the residue washed with water and vacuum-dried (yield 89.2 g=72% of a white powder having a melting point of >320° C.).

b) Production of a modified synthetic polyamide 100 parts of poly-ε-caprolactam in powder form are mixed with 1.0 parts of the compound obtained under 12 a) above in a drum mixer. After a short time, the powder is dispersed very evenly. After ca. 10 minutes, the mixture is dried for 16 hours at 120°, added to a melt spinning machine, and after leaving for 8 minutes at 275–280° C. under a nitrogen atmosphere, is spun into fibres.

The fibres are dyed conventionally by exhaustion with 0.5% with, the dyestuff C.I. Acid Red 216.

Very evenly red-dyed fibres are obtained having excellent brilliance, with very good washing, light and rubbing fastness properties. Poly-ε-caprolactam fibres which have not been modified according to the invention but are dyed in the same way have considerably less depth of colour and brilliance and noticeably reduced fastness.

Instead of C.I. Acid Red 404, an appropriate amount of one of the following dyestuffs can also be used C.I. Acid Blue 80,
C.I. Acid Yellow 129,
C.I. Acid Violet 66,
C.I. Acid Blue 129, C.I. Acid Green 28 and
C.I. Acid Red 119.

In a method analogous to that of Example 12, an appropriate amount of any one of Compounds 1 to 21 defined above can be worked into polyamide in the mass, which is then spun into fibres and dyed with one of the acid dyes described above.

Example 13

872 parts of N-methylpyrrolidone are charged into a 1.5 litre reaction vessel. 28.35 parts (0.2625 moles) of 1,4 diaminobenzene are added at 20° (±2°) to this reaction vessel. The mixture is then cooled to 0° and 50.75 parts (0.25 moles) of terephthalic acid dichloride is added portion by portion, stirring well, and the mixture is held at a constant temperature. When the addition is completed, the mixture is heated over 4 hours from 20–80° in stages. 5.3 parts (0.0125 moles) of 1'chloro-3,5-bis(2',2',6',6'-tetramethylpiperidyl-4'amino)-triazine are added and the mixture is stirred at 100° for 4 hours.

The resulting solid is then filtered and washed with water and separated from the filtrate. It is then dried under vacuum at 100° C. under 20 mm of mercury (Hg). 66.0 parts of a polyamide results as a light beige powder which has good dyeing properties.

This modified polymer can be incorporated into untreated polyamide by conventional master batch methods.

Examples 14–32

Example 13 can be repeated by condensing 0.2625 moles of the diamine of column 1 of Table 1 below, with 0.25 moles of the dicarboxylic acid dichloride of column 2 of Table 1 below and 0.0125 moles of the chloro-compound of column 3 of Table 1 below. $R_4'$ in the following tables is always the group 2,2,6,6-tetramethylpiperidyl-4 and $R_5$ is the group 1,2,2,6,6-pentamethylpiperidyl-4.

TABLE 1

| Example No. | Column 1<br>Amine | Column 2<br>Carboxylic acid<br>dichloride | Column 3<br>Chloro-compound |
| --- | --- | --- | --- |
| 14 | 1,3 diaminobenzene | isophthalic acid dichloride (benzene 1,3-dicarboxylic acid dichloride) | 2 chloro-4,6-bis(2',2',6',6-tetramethylpiperidyl-4' amino)-triazine |
| 15 | " | isophthalic acid dichloride (benzene 1,3-dicarboxylic acid dichloride) | Cl—CO—⌬—NH—(triazine with two NH—$R_4'$) |
| 16 | 1,4 diaminobenzene | terephthalic acid dichloride (benzene 1,4-dicarboxylic acid dichloride) | " |
| 17 | " | terephthalic acid dichloride (benzene 1,4-dicarboxylic acid dichloride) | Cl—(triazine with two NH—$R_4'$) |
| 18 | 1,3 diaminobenzene | isophthalic acid dichloride | " |
| 19. | " | " | Cl—(triazine with NH—$R_4'$ and NH—⌬—NH—$R_5$) |
| 20 | 1,4 diaminobenzene | terephthalic acid dichloride | " |

TABLE 1-continued

| Example No. | Column 1 Amine | Column 2 Carboxylic acid dichloride | Column 3 Chloro-compound |
|---|---|---|---|
| 21 | 1,4 diaminobenzene | terephthalic acid dichloride | 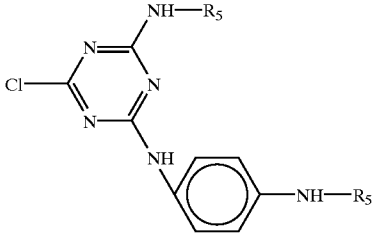 |
| 22 | 1,3 diaminobenzene | isophthalic acid dichloride | " |
| 23 | " | " | 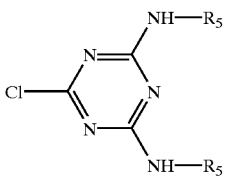 |
| 24 | 1,4 diaminobenzene | terephthalic acid dichloride | " |
| 25 | " | terephthalic acid dichloride | Cl—CH$_2$CONH—R$_4'$ |
| 26 | 1,3 diaminobenzene | isophthalic acid dichloride | " |
| 27 | " | " | 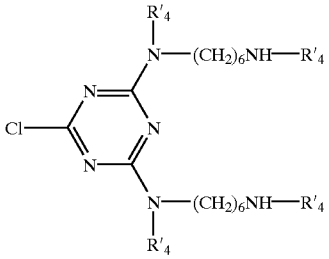 |
| 28 | 1,4 diaminobenzene | terephthalic acid dichloride | " |
| 29 | " | terephthalic acid dichloride | 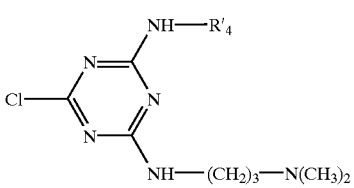 |
| 30 | 1,3 diaminobenzene | isophthalic acid dichloride | " |
| 31 | 1,3 diaminobenzene | isophthalic acid dichloride | 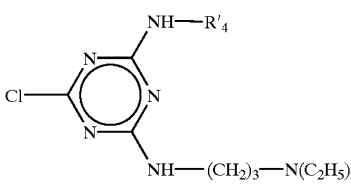 |
| 32 | 1,4 diaminobenzene | terephthalic acid dichloride | " |

Example 33

Example 13 is repeated using 27.0 parts (0.25 moles) of 1,4-diaminobenzene (instead of 28.35 parts in Example 13); 51 parts (0.25125 moles) terephthalic acid dichloride (instead of 50.75 parts in Example 13); and 0.3 parts (0.00125 moles) of 1-amino-4-(2',2',6',6'-tetramethylpiperidinyl-4'-amino)benzene (instead of 53 parts of 1-chloro-3.5-bis(2',2',6',6'-tetramethylpiperidinyl-4'-amino) triazine.

61.3 parts of a modified polyamide results with good properties.

Examples 34–48

Example 33 is repeated condensing 0.25 moles of the amine of column 1, 0.25125 moles of the dichloride of column 2 and 0.00125 moles of the amino compound of column 3 of Table 2 below. $R_4'$ is 2,2,6,6 tetramethylpiperidinyl-4.

TABLE 2

| Example No. | Column 1<br>Amine | Column 2<br>dichloride | Column 3<br>Amino compound |
|---|---|---|---|
| 34 | 1,3 diaminobenzene | isophthalic acid dichloride | $H_2N$—⟨C_6H_4⟩—NH—$R_4'$ |
| 35 | " | " | $H_2N$—⟨C_6H_4⟩—NH—(triazine with two NH—$R_4'$ groups) |
| 36 | 1,4 diaminobenzene | terephthalic acid dichloride | " |
| 37 | " | terephthalic acid dichloride | 3,5-diamino-benzene-CONH—$R_4'$ |
| 38 | 1,3 diaminobenzene | isophthalic acid dichloride | " |
| 39 | " | " | 2-amino-4-amino-benzene-CONH—$R_4'$ |
| 40 | 1,4 diaminobenzene | terephthalic acid dichloride | " |
| 41 | " | terephthalic acid dichloride | $H_2N(CH_2)_3HN$—(triazine)—NHR$_4'$, —NH—$(CH_2)_3$—$NH_2$ |
| 42 | 1,3 diaminobenzene | isophthalic acid dichloride | " |
| 43 | " | " | $H_2N(CH_2)_4$—(triazine)—NHR$_4'$, —NH—$(CH_2)_4$—$NH_2$ |
| 44 | 1,4 diaminobenzene | terephthalic acid dichloride | " |

TABLE 2-continued

| Example No. | Column 1 Amine | Column 2 dichloride | Column 3 Amino compound |
|---|---|---|---|
| 45 | " | terephthalic acid dichloride | 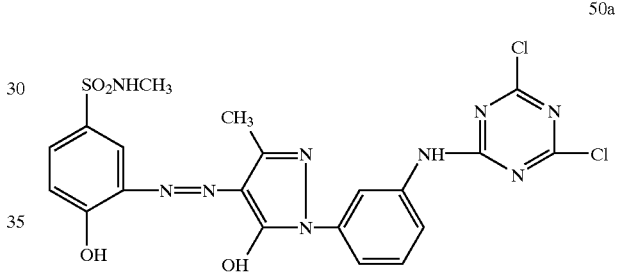 |
| 46 | 1,3 diaminobenzene | isophthalic acid dichloride | " |
| 47 | " | " | 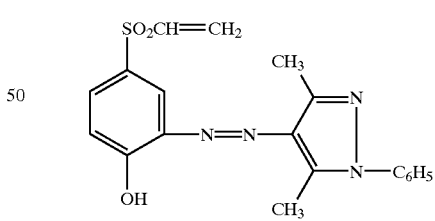 |
| 48 | 1,4 diaminobenzene | terephthalic acid dichloride | " |

Example 49

98 parts of a granulate of Nylon 6 is mixed for 1 hour with 2% of 2-chloro-4,6-bis-(2',2',6',6'-tetramethylpiperidyl-41-amino)triazine in a powder mixer (Rhoenrad) then this is treated in a laboratory extruder (MARIS TM 33 V/32 D) and it is then spun into fibres under the following conditions Speed of the screw: 321
Rate of dosage: 40%
Rate of extrusion: 23 kg/h
Pressure: 2 bar

| Temperature in zone | |
|---|---|
| 1: | 168° |
| 2–6: | 300° |
| 7: | 259° |
| 8: | 256° |
| 9: | 263° |

The resulting fibres can be used as such or can be used in the form of a yarn or web or piece such as polyamide fibre material. The fibres can be dyed with suitable acid dyes, for example C.I. Acid Red 404,
C.I. Acid Violet 66,
C.I. Acid Yellow 129,
C.I. Acid Blue 129,
C.I. Acid Green 28
C.I. Acid Red 119 or
C.I. Acid Blue 80.

Exhaust-Dyeing can be carried out by known methods. The fabrics can also be printed. The resulting dyeings show excellent depth of color (compared to the same dye without the modifiedpoly-ε-caprolactam. They have good brilliance and good wet fastness properties.

Example 50

Example 1 is repeated, but instead of the 2 parts of the compound of formula 1a, 1.5 parts of the 1:2-chrome complex of the dyestuff of formula 50a 50a

[structure of dyestuff 50a with $SO_2NHCH_3$, OH, azo linkage to pyrazole with $CH_3$, NH linkage to dichlorotriazine]

are used. The resultant dyeings result in very full, brilliant and fast red dyed fibres.

Example 51

Example 50 is repeated using an equivalent amount of the 1:2-chrome complex of the dyestuff of formula 51a 51a

[structure 51a with $SO_2CH=CH_2$, OH, azo linkage to pyrazole with $CH_3$, $C_6H_5$]

Deep, brilliant and very fast dyed fibres are similarly obtained.

Examples 52–69

By a method analogous to that of Example 50, using a molar equivalent amount of one of the following compounds of Table 3 below instead of the component of formula 50a, fast and brilliant coloured fibre material can be produced. The colours of the resulting dyeings 're also shown in Table 3.

Examples 52–58 are 1:2 chromium complexes

TABLE 3

| Example | Compound | Colour |
|---|---|---|
| 52 | 2-hydroxy-5-(N-methylsulfamoyl)phenylazo-(3,5-dimethyl-1-{4-[(4,6-dichloro-1,3,5-triazin-2-yl)amino]phenyl}pyrazol-4-yl) | red |
| 53 | 2-hydroxy-5-(N-methylsulfamoyl)phenylazo-(3,5-dimethyl-1-{4-[acryloylamino]phenyl}pyrazol-4-yl) | orange-red |
| 54 | 2-hydroxy-5-(N-methylsulfamoyl)phenylazo-(3,5-dimethyl-1-{4-[acryloylamino]phenyl}pyrazol-4-yl) | red |
| 55 | 2-hydroxy-4-(N-methylsulfamoyl)phenylazo-(3,5-dimethyl-1-{4-[(4,6-dichloro-1,3,5-triazin-2-yl)amino]phenyl}pyrazol-4-yl) | " |
| 56 | 2-hydroxy-5-(N-methylsulfamoyl)phenylazo-(3,5-dimethyl-1-{4-[(4,6-dichloro-1,3,5-triazin-2-yl)amino]phenyl}pyrazol-4-yl) | red |
| 57 | 2-hydroxy-4-(N-methylsulfamoyl)phenylazo-(3,5-dimethyl-1-{4-[acryloylamino]phenyl}pyrazol-4-yl) | " |

TABLE 3-continued

| Example | Compound | Colour |
|---|---|---|
| 58 | [structure: 4-(SO₂NHCH₃)-2-hydroxyphenyl azo pyrazole with 3,5-dimethyl and N-phenyl bearing NH—CO—CH=CH₂] | " |
| 59 | [structure: perinone/benzimidazole-naphthalimide fused system with NH linked to dichlorotriazine] | yellow |
| 60 | [structure: perinone/benzimidazole-naphthalimide with NHCOCH=CH₂] | yellow |
| 61 | [structure: perinone/benzimidazole-naphthalimide with NH—SO₂CH₂CH₂OSO₃H] | yellow |
| 62 | [structure: dichlorotriazine linked to Ni complex of bis(naphthylideneamine)phenylenediamine] | orange-red |
| 63 | [structure: anthraquinone with HN-linked dichlorotriazine] | orange |

TABLE 3-continued
| Example | Compound | Colour |
|---|---|---|
| 64 | 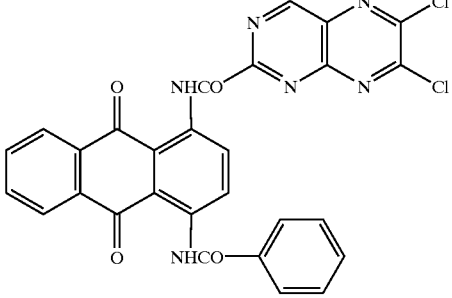 | |
| 65 | 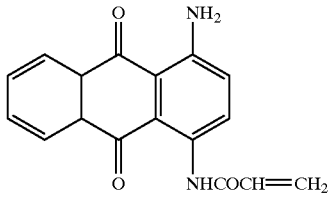 | |
| 66 | 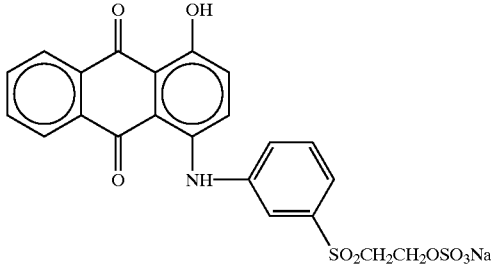 | blue |
| 67 | 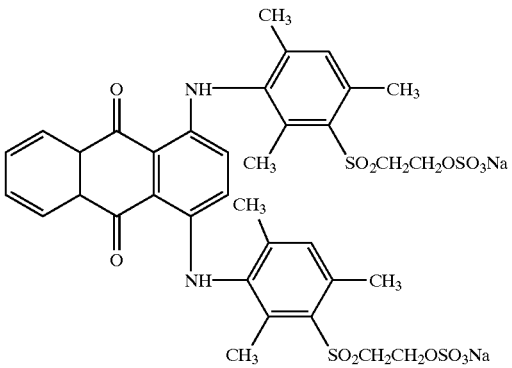 | blue |
| 68 | 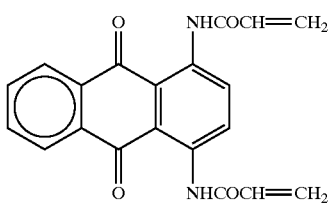 | red |

TABLE 3-continued

| Example | Compound | Colour |
|---------|----------|--------|
| 69 | 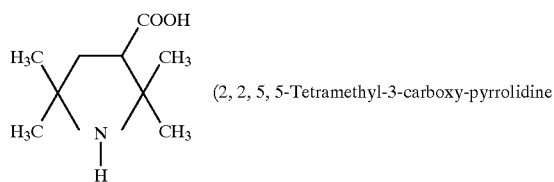 | red |

Example 70

By a method analogous to that of Example 12a, 2 moles of the compound of formula 70a

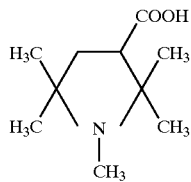

(2, 2, 5, 5-Tetramethyl-3-carboxy-pyrrolidine (2,2,5,5-tetramethyl-3-carboxy-pyrrolidine described in Japanese Kokai 60-190786) is reacted with 1 mole of thionylchloride to form the acid chloride. This is dissolved in dioxan and is condensed with 1 mole of 1,4-diaminobenzene. The reaction product is filtered, treated with aqueous alkali, filtered again, washed and dried under vacuum. The resulting product is treated according to the method of Sample 12b and modified poly-e-caprolactam fibres result, which can be dyed with the dyestuffs described in Example 12b. The dyeings that result are brilliant in color and have good fastness properties.

Examples 71–73

Example 70 is repeated using molar equivalents of one of the following

Example 71: 1,2,2,5,5-pentamethyl-3-carboxy-pyrrolidine

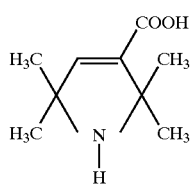

Example 72: 2,2,5,5-tetramethyl-3-carboxy-pyrroline

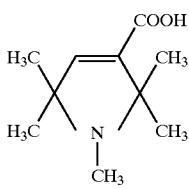

Example 73: 1,2,2,5,5-Pentamethyl-3-carboxy-pyrroline

Examples 74–77

Example 70 is repeated using molar equivalents of the following:
Example 74: 2,2,5,5-tetramethyl-3-carboxy-pyrrolidine
Example 75: 1,2,2,5,5-pentamethyl-3-carboxy-pyrrolidine
Example 76: 2,2,5,5-tetramethyl-3-carboxy-pyrroline and
Example 77: 1,2,2,5,5-pentamethyl-3-carboxy-pyrroline.

These are reacted with 1,6-hexamethylene diamine and produce modified polyamide fibres having good dyeing properties.

Examples 78 and 79

Example 12 is repeated using 2 moles of 2,2,6,6-tetramethylpiperazine-3-one with 1 mole of terephthalic acid dichloride. This produces poly-e-caprolactam (Nylon 6) which can be spun into fibres. A fibre material results with very good dyeability and resulting dyes are of very high quality.

Example 12 can also be repeated using a condensation product derived from 2 moles of 1,2,2,6,6-pentamethylpiperazine-3-one with 1 mole of isophthalic acid dichloride.

Examples 80 and 81

The addition product of 2 moles of the compound of Formula 80a

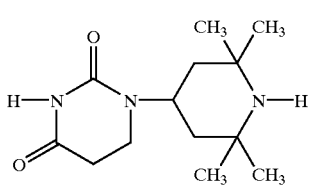

and 1 mole of bis-(4-isocyanatophenylene)-methane (from Example 2 of U.S. Pat. No. 4,816,585) can be worked into Nylon 6 according to the method of Example 12b to produce a polyamide of similar quality to that of Example 12b.

A similar effect can be produced by using the addition product of 1 mole of 1,6-diisocyanatohexamethylene and 2 moles of the above mentioned product of Formula 80 described above.

Examples 82 and 83

1 mole of 2,4,6-trichloratriazine can be condensed with 1 mole of 2,2,6,6-tetramethylene-4-aminopiperidine and 1 mole of 2,2,6,6-tetramethylpiperazine-3-one according to the method of Example 1.

1 mole of 2,4,6-trichloro triazine can be condensed with 1 mole of 3,3,5,5,7-pentamethyl-1,4-diazepine-2-one (described in U.S. Pat. No. 4,292,240) and 1 mole of 2,2,6,6-tetramethyl-4-aminopiperidine.

Either reaction product can be worked into poly-ε-caprolactam and the resulting polyamide fibres have good dyeing properties.

Example 84 a) Non-matted polyamide-6 (Grilon A22 in the form of chips from Emser Werke AG, having a solution viscosity 2.01) is dyed with 10% (based on the weight of substrate) of C.I. Acid Blue 129 in the presence of 4 g/l of sodium phosphate at a good to liquor ratio of 1:3. Dyeing was carried out for 2 hours at boiling.

After filtering and washing with water at room temperature aftertreating is carried out as follows:

500 g PA-6 (previously bath-dyed with C.I. Acid Blue 129) were suspended under stirring in an aqueous solution (1l.) containing 5% bis protonated 2,4-bis-(2',2',6',6'-tetramethyl piperidyl-4'-amino)-6-chlorotriazine [acid for protonation used: HCl or acetic acid]and heated at 60° C. for 1 hours, filtered, washed with water, dried and then spun to fiber.

What is claimed is:

1. In a polymerization process for manufacturing polyamide by way of a polycondensation reaction, said process is characterized by addition before or during said polymerization of a reactive hindered amino group-containing compound and reacting said compound with said polyamide polymer structure.

2. The process of claim 1 wherein said compound contains one or two sterically hindered amino groups in a cyclic structure.

3. The process of claim 2 wherein said sterically hindered amino group contains

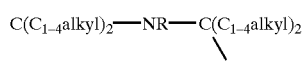

in which R is hydrogen, $C_{1-8}$alkyl, $C_{1-8}$alkoxy, or —$COR_5$, $R_5$ is hydrogen, $C_{1-6}$alkyl, phenyl, $COO(C_{1-4}$alkyl) or $NR_{15}R_{16}$;

$R_{15}$ is hydrogen, $C_{1-12}$alkyl, $C_{5-6}$cycloalkyl, phenyl, or ($C_{1-2}$alkyl)phenyl; and $R_{16}$ is $C_{1-12}$alkyl or hydrogen; or $R_{15}$ and $R_{16}$ together with the N atom to which they are attached form a five- to seven-membered ring.

4. The process of claim 1 wherein said compound has the structure:

$R_{12}$—H wherein $R_{12}$ is a 2,2,6,6-tetraalkyl-piperidinyl group.

5. The process of claim 4, wherein $R_{12}$— is 2,2,6,6-tetramethyl-piperidinyl-amino.

6. The product made according to the process of claim 1.

7. The product made according to the process of claim 2.

8. The product made according to the process of claim 3.

9. The product made according to the process of claim 4.

10. The product made according to the process of claim 5.

* * * * *